US012657453B2

(12) United States Patent
Finzi et al.

(10) Patent No.: US 12,657,453 B2
(45) Date of Patent: Jun. 16, 2026

(54) PROBABILISTIC NUMERIC CONVOLUTIONAL NEURAL NETWORKS

(71) Applicant: QUALCOMM Incorporated, San Diego, CA (US)

(72) Inventors: Marc Anton Finzi, Chevy Chase, MD (US); Roberto Bondesan, Amsterdam (NL); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 1171 days.

(21) Appl. No.: 17/491,351

(22) Filed: Sep. 30, 2021

(65) Prior Publication Data

US 2022/0108173 A1    Apr. 7, 2022

Related U.S. Application Data

(60) Provisional application No. 63/086,339, filed on Oct. 1, 2020.

(51) Int. Cl.
G06N 3/08 (2023.01)
G06N 3/047 (2023.01)
G06N 3/048 (2023.01)

(52) U.S. Cl.
CPC .............. G06N 3/08 (2013.01); G06N 3/047 (2023.01); G06N 3/048 (2023.01)

(58) Field of Classification Search
CPC ........... G06N 3/08; G06N 3/047; G06N 3/048
See application file for complete search history.

(56) References Cited

U.S. PATENT DOCUMENTS

| | | | |
|---|---|---|---|
| 2018/0039745 A1* | 2/2018 | Chevalier | G16H 50/20 |
| 2019/0026466 A1* | 1/2019 | Krasser | G06N 7/01 |
| 2022/0051796 A1* | 2/2022 | Zhu | G06N 3/045 |

OTHER PUBLICATIONS

Jun E. et al., "Uncertainty-Gated Stochastic Sequential Model for EHR Mortality Prediction", IEEE Transactions on Neural Networks and Learning Systems, vol. 32, Iss. 9 (Available Aug. 25, 2020). (Year: 2020).*

Dera D., et al., "Extended Variational Inference for Propagating Uncertainty in Convolutional Neural Networks", 2019 IEEE 29Th International Workshop on Machine Learning for Signal Processing (MLSP), IEEE, Oct. 13, 2019 (Oct. 13, 2019), pp. 1-6, XP033645834, DOI: 10.1109/MLSP.2019.8918747, [retrieved on Dec. 2, 2019] p. 2.

Hegde P.,et al., "Deep Learning with Differential Gaussian Process Flows", arxiv.org, Cornell University Library, 201 Olin Library Cornell University Ithaca, NY 14853, Oct. 9, 2018 (Oct. 9, 2018), pp. 1-15, XP080923106, Abstract.

International Search Report and Written Opinion—PCT/US2021/053219—ISA/EPO—Jan. 31, 2022.

(Continued)

*Primary Examiner* — Brian M Smith
(74) *Attorney, Agent, or Firm* — Patterson & Sheridan LLP

(57) ABSTRACT

Certain aspects of the present disclosure provide techniques for performing operations with probabilistic numeric convolutional neural network, including: defining a Gaussian Process based on a mean and a covariance of input data; applying a linear operator to the Gaussian Process to generate pre-activation data; applying a nonlinear operation to the pre-activation data to form activation data; and applying a pooling operation to the activation data to generate an inference.

25 Claims, 3 Drawing Sheets

(56) References Cited

OTHER PUBLICATIONS

Li S.C., et al., "A Scalable End-to-End Gaussian Process Adapter for Irregularly Sampled Time Series Classification", arxiv.org, Cornell University Library, 201 Olin Library Cornell University Ithaca, NY 14853, Jun. 14, 2016 (Jun. 14, 2016), 12 Pages, XP080708396, p. 1-p. 4 p. 6 p. 8.

\* cited by examiner

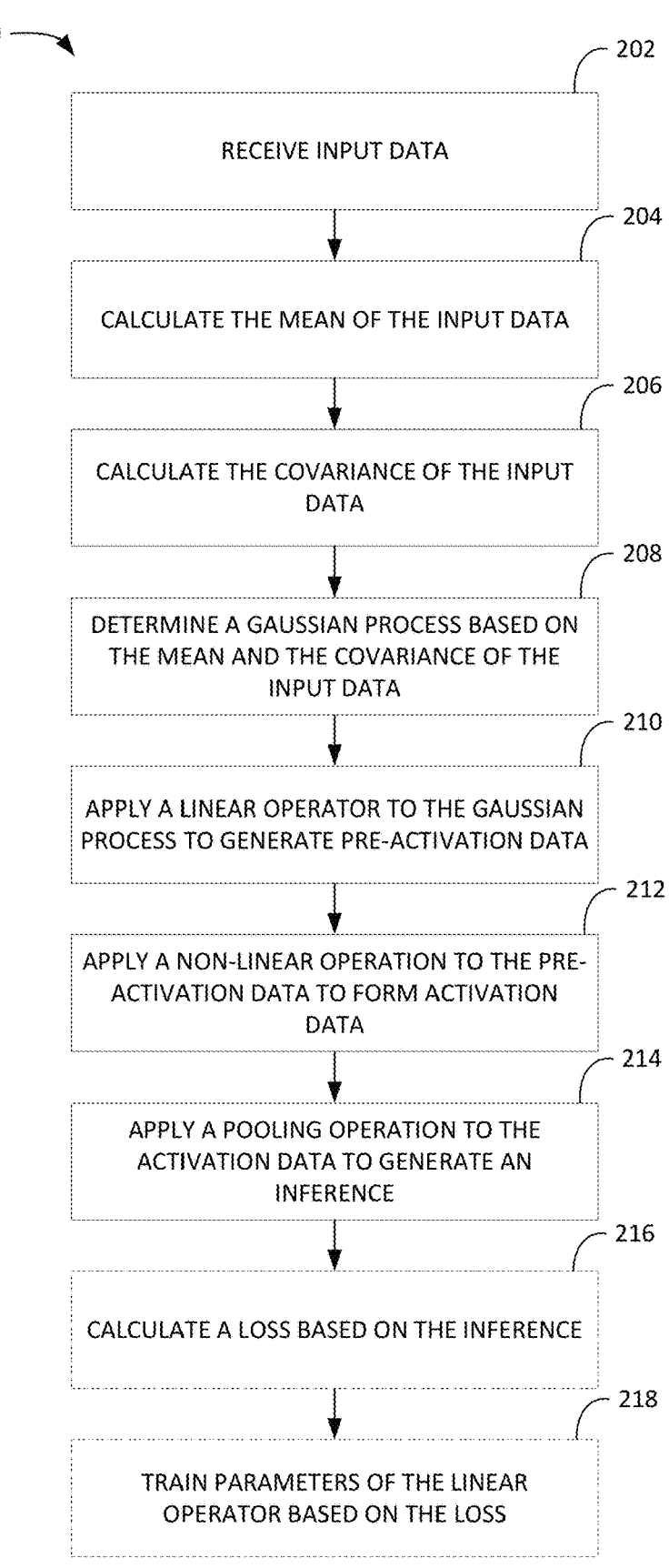

200

202
RECEIVE INPUT DATA

204
CALCULATE THE MEAN OF THE INPUT DATA

206
CALCULATE THE COVARIANCE OF THE INPUT DATA

208
DETERMINE A GAUSSIAN PROCESS BASED ON THE MEAN AND THE COVARIANCE OF THE INPUT DATA

210
APPLY A LINEAR OPERATOR TO THE GAUSSIAN PROCESS TO GENERATE PRE-ACTIVATION DATA

212
APPLY A NON-LINEAR OPERATION TO THE PRE-ACTIVATION DATA TO FORM ACTIVATION DATA

214
APPLY A POOLING OPERATION TO THE ACTIVATION DATA TO GENERATE AN INFERENCE

216
CALCULATE A LOSS BASED ON THE INFERENCE

218
TRAIN PARAMETERS OF THE LINEAR OPERATOR BASED ON THE LOSS

302 — CPU

308 — NPU

304 — GPU

310 — INPUT/OUTPUT

306 — DSP

312 — CONNECTIVITY

314 — MEMORY

314A — GAUSSIAN PROCESS COMPONENT

314F — LOSS CALCULATION COMPONENT

314B — LINEAR OPERATOR COMPONENT

314G — TRAINING COMPONENT

314C — NONLINEAR OPERATION COMPONENT

314H — INFERENCING COMPONENT

314D — POOLING COMPONENT

314I — MODEL PARAMETERS

314E — MEASURING COMPONENT

314J — MODELS

PROBABILISTIC NUMERIC CONVOLUTIONAL NEURAL NETWORKS

CROSS-REFERENCE TO RELATED APPLICATIONS

This application claims the benefit of and priority to U.S. Provisional Patent Application No. 63/086,339, filed on Oct. 1, 2020, the entire content of which is hereby incorporated by reference.

INTRODUCTION

Aspects of the present disclosure relate to probabilistic numeric convolutional neural networks.

Machine learning is generally the process of producing a trained model (e.g., an artificial neural network, a tree, or other structures), which represents a generalized fit to a set of training data. Applying the trained model to new data produces inferences, which may be used to gain insights into the new data.

Machine learning models are seeing increased adoption across myriad domains, including for use in classification, detection, and recognition tasks. For example, machine learning models are being used to perform complex tasks on electronic devices based on sensor data provided by one or more sensors onboard such devices, such as automatically detecting features (e.g., faces) within images.

One particularly powerful type of machine learning model is the convolutional neural network (CNN) model, which is a type of deep neural network model that can be trained to identify various features in input data based. CNNs typically rely on kernels or filters that are strided across a grid of input data, such as the grid formed by pixels in an image, through various layers of the CNN. Inherent in the conventional design of a CNN, then, is that the input data will be sampled regularly, such as in rectangular grids of input image data.

Unfortunately, not all input data is regularly sampled. For example, continuous input signals, like time series, that are irregularly sampled or which have missing values are challenging for existing deep learning model architectures, such as CNNs.

Accordingly, methods are needed to improve the performance of CNNs when processing continuous input data.

BRIEF SUMMARY

Certain aspects provide a method for performing operations with probabilistic numeric convolutional neural network, including: defining a Gaussian Process based on a mean and a covariance of input data; applying a linear operator to the Gaussian Process to generate pre-activation data; applying a nonlinear operation to the pre-activation data to form activation data; and applying a pooling operation to the activation data to generate an inference.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 2 depicts an example method for training a probabilistic numeric neural network.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
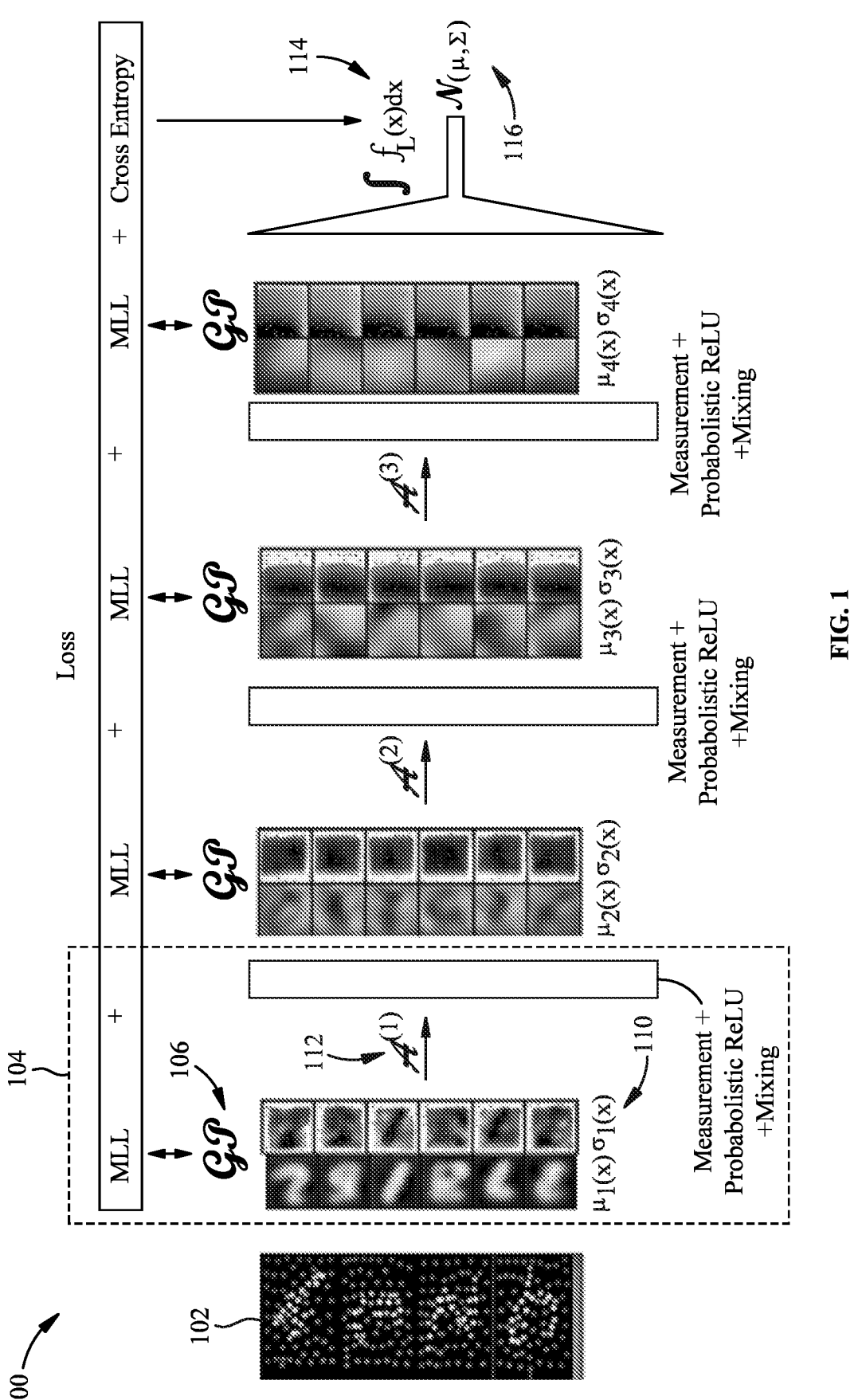
FIG. 1 depicts an example of process for training a probabilistic numeric convolutional neural network.

Aspects of the present disclosure provide apparatuses, methods, processing systems, and computer-readable mediums for applying probabilistic numerics to convolutional neural networks (CNNs) to improve such models' ability to process continuous input data, including irregularly sampled input data.

Continuous input signals, like time series that are irregularly sampled or have missing values, are challenging for existing deep learning methods. One reason for this is that coherently defined feature representations generally depend on the values in unobserved regions of the input of irregularly sampled data. To overcome this issue, probabilistic numeric convolutional neural networks are described herein, which represent features as Gaussian processes, providing a probabilistic description of discretization error. Such probabilistic numeric convolutional neural networks define a convolutional layer as the evolution of a partial differential equation defined on a Gaussian process, followed by a nonlinear operation. Probabilistic numeric convolutional neural networks yield significant reductions in error from the previous state of the art on well-known datasets, such as SuperPixel-MNIST.

Standard convolutional neural networks are defined on a regular input grid. For continuous signals, these elements correspond to regular samples of an underlying function $f$ defined on a continuous domain. In such cases, the standard convolutional layer of a neural network is a numerical approximation of a continuous convolution operator $\mathcal{A}$.

Coherently defined networks on continuous functions should only depend on the input function $f$, and not on spurious shortcut features, such as the sampling locations or sampling density, which enable overfitting and reduce robustness to changes in the sampling procedure. Each application of $\mathcal{A}$ in a standard neural network incurs some discretization error which is determined by the sampling resolution. In some sense, this error is unavoidable because the features $f^{(\ell)}$ at the layers $\ell$ depend on the values of the input function $f$ at regions that have not been observed. For input signals which are sampled at a low resolution, or even sampled irregularly (e.g., such as with the sporadic measurements of patient vitals data in ICUs or dispersed sensors for measuring ocean currents), this discretization error cannot be neglected. Simply filling in the missing data with zeros or imputing the values is not sufficient since many different imputations are possible, each of which can affect the outcomes of the network.

Probabilistic numerics is an emergent field that studies discretization errors in numerical algorithms using probability theory. As described herein, probabilistic numerics may be built upon to quantify the dependence of a model (e.g., neural network) on the regions in the input which are unknown, and integrate this uncertainty into the computation of the model. To do so, the discretely evaluated feature maps $$\{f^{(\ell)}(x_i)\}_{i=1}^{N}$$

are replaced with Gaussian processes: distributions over the continuous function $\mathcal{A}$ that track the most likely values as well as the uncertainty. Beneficially, this Gaussian process feature representation need not resort to discretizing the convolution operator $\mathcal{A}$ as in a standard convolution an neural network, but instead the continuous convolution operator may be applied directly. If a given feature is a Gaussian process, then applying linear operators yields a new Gaussian process with transformed mean and covariance functions. The dependence of $\mathcal{A}f$ on regions of $f$ that are not known translates into the uncertainty represented in the transformed covariance function, the analogue of the discretization error in a convolutional neural network, which is now tracked explicitly. The resulting model, as described further herein, may be referred to as a probabilistic numeric convolutional neural network (PNCNN).

Probabilistic Numerics

Probabilistic numeric convolutional neural networks, as described herein, leverage probabilistic numerics in which the error in numerical algorithms are modeled probabilistically, and typically with a Gaussian process. In this framework, only a finite number of input function calls can be made, and therefore the numerical algorithm can be viewed as an autonomous agent which has epistemic uncertainty over the values of the input. One example is Bayesian Monte Carlo model where a Gaussian process is used to model the error in the numerical estimation of an integral and optimally select a rule for its computation. Probabilistic numerics has been applied to numerical problems, such as the inversion of a matrix, the solution of an ordinary differential equation, a meshless solution to boundary value partial differential equations, and other numerical problems.

Gaussian Processes

Probabilistic numeric convolutional neural networks, as described herein, operate on a continuous function $f(x)$ underlying the input based on a collection of the values of that function sampled on a finite number of points $$\{x_i\}_{i=1}^{N}.$$

Classical interpolation theory reconstructs $f$ deterministically by assuming a certain structure of the signal in the frequency domain. Gaussian processes (GPs) give a way of modeling beliefs about values that have not been observed.

These beliefs are encoded into a prior covariance k of the GP, $f \sim \mathcal{GP}(0, k)$, and updated with Bayesian inference upon seeing data. Explicitly, given a set of sampling locations $$x = \{x_i\}_{i=1}^{N}$$

and noisy observations $$y = \{y_i\}_{i=1}^{N}$$

sampled $$y_i \sim N(f(x_i), \sigma_i^2),$$

using Bayes rule, the posterior distribution $f|y,x \sim \mathcal{GP}(\mu_p, k_p)$ may be computed, which captures the epistemic uncertainty about the values between observations. The posterior mean $\mu_p(x)$ and covariance $k_p(x, x')$ are given by:

$$\mu_p(x) = k(x)^T [K+S]^{-1} y, k_p(x,x') = k(x,x') - k(x)^T [K+S]^{-1} k(x'), \tag{1}$$

where $K_{ij} = k(x_i, x_j)$, $k(x)_i = k(x, x_i)$ and $S = \text{diag}(\sigma_i^2)$.

In some aspects, a radial basis function (RBF) kernel $(k_{RBF})$ may be used to determine a prior covariance, due to its convenient analytical properties. For example:

$$k_{RBF}(x, x') = a\mathcal{N}(x; x', l^2 I) = a(2\pi l^2)^{-\frac{d}{2}} \exp\left(-\frac{1}{2l^2} \|x - x'\|^2\right).$$

In typical applications of GPs to machine learning tasks, such as regression, the function $f$ that is predicted is already the regression model. In contrast, here GPs are used as a way of representing beliefs and epistemic uncertainty about the values of both the input function and the intermediate feature maps of a model (e.g., a deep neural network model).

Probabilistic Numeric Convolutional Neural Networks

Given a continuous input signal $f: X \to \mathbb{R}^c$, a network with layers may be defined that acts directly on this continuous input signal. In one aspect, a neural network may be defined recursively from the input $f^{(0)} = f$, as a series of L continuous convolutions $\mathcal{A}^{(\ell)}$ with pointwise nonlinearities (e.g., ReLU) and weight matrices ($M^{(\ell)}$, $M \in \mathbb{R}^{c \times c}$) that mix only channels (known as 1×1 convolutions) according to:

$$f^{(\ell+1)} = M^{(\ell)} \text{ReLU}[\mathcal{A}^{(\ell)} f^{(\ell)}], \tag{2}$$

A final global average pooling layer $\mathcal{P}$ may be added that acts channel-wise as a natural generalization of the discrete case:

$$\mathcal{P}(f^{(L)})_\alpha = \int f_\alpha^{(L)}(x)dx$$

for each $\alpha=1, 2, \ldots, c$. Denoting the space of functions on X with c channels by $H_c$, the convolution operators $\mathcal{A}^{(\ell)}$ are linear operators from $H_{c_\ell}$ to $H_{c_{\ell+1}}$. Like in ordinary convolutional neural networks, the layers build up increasingly more expressive spatial features and depend on the parameters in $\mathcal{A}^{(\ell)}$ and $M^{(\ell)}$. Unlike ordinary convolutional networks, these layers are well defined operations on the underlying continuous signal.

While it is clear that such a network can be defined abstractly, the exact values of the function $f^{(L)}$ generally cannot be computed as the operators depend on unknown values of the input. However, by adapting a probabilistic description, it is possible to formulate ignorance of $f^{(0)}$ with a Gaussian process and see how the uncertainties propagate through the layers of the network, yielding a probabilistic output. The following briefly describes important components of Equation 2 that make this possible, with more detailed descriptions below.

Continuous convolution operators $\mathcal{A}$ in Equation 2 can be applied to input Gaussian process $f \sim \mathcal{GP}$ $(\mu_p, k_p)$ in closed form. The output is another Gaussian process with a transformed mean and covariance: $\mathcal{A} f \sim \mathcal{GP}$ $(\mathcal{A} \mu_p, \mathcal{A} k_p \mathcal{A}')$, where $\mathcal{A}'$ acts to the left on the primed argument of $k_p$ (x, x'). Below it is described how to parametrize these continuous convolutions in terms of the flow of a partial differential equation and show how they can be applied to the radial basis function kernel exactly in closed form.

Applying a ReLU nonlinearity to a Gaussian process in Equation 2 yields a new non-Gaussian stochastic process $h^{(\ell)} = \mathrm{ReLU}[\mathcal{A}^{(\ell)} f^{(\ell)}]$, and the mean and covariance of this process has a closed form solution which can be computed. This may generally be referred to as a probabilistic ReLU function.

The activations $\mathcal{A}^{(\ell)}$ in Equation 2 are not Gaussian; however, for a large number of weakly dependent channels, it can be shown that $f^{(\ell+1)} = M^{(\ell)} h^{(\ell)}$ is approximately distributed as a Gaussian Process, as described further below.

While $f^{(\ell+1)}$ in Equation 2 is approximately a Gaussian process, the mean and covariance functions have a complicated form. Instead of using these functions directly, it is possible to take measurements of the mean and variance of this process and feed them in as noisy observations to a fresh radial basis function kernel Gaussian process, allowing the process to be repeated and to build up multiple layers without increasing complexity.

In some aspects, the Gaussian process feature maps in the final layer $f^{(L)}$ are aggregated spatially by an integral pooling $\mathcal{P}$ that can also be applied in closed form to yield a Gaussian output. Assembling these components allow implementation of an end-to-end trainable probabilistic numeric convolutional neural network, which integrates a probabilistic description of missing data and discretization error inherent to continuous signals.

Continuous Convolutional Layers

On a discrete domain, such as the lattice $X=\mathbb{Z}^d$, all translation equivariant linear operators $\mathcal{A}$ are convolutions. In general, these convolutions can be written in terms of a linear combination of powers of the generators of the translation group: the shift operators $\tau_i$, i=1, ..., d shift all elements by one unit along the i-th axis of the grid. For a one dimensional grid, one can always write $\mathcal{A}=\Sigma_k W_k \tau^k$ where the weight matrices $W_k \in \mathbb{R}^{c \times c}$ act only on the channels and the shift operator $\tau$ acts on functions on the lattice. In d dimensions, $$\mathcal{A} = \sum_{k_1, \ldots, k_d} W_{k_1, \ldots, k_d} \tau_1^{k_1} \cdots \tau_d^{k_d}$$

for some set of integer coefficients $k_1, \ldots, k_d$. For example when d=2, $k_1, k_2 \in \{-1, 0, 1\}$ can be taken to fill out a 3×3 neighborhood.

On the continuous domain $X=\mathbb{R}^d$, convolutions may be similarly parametrized with $\mathcal{A}=\Sigma_k W_k e \mathcal{D}^k$, where $\mathcal{D}_k$ is given by powers of the partial derivatives $\partial_i$, i=1, ..., d that generate infinitesimal translations along the i-th axes. Setting d=1 for simplicity, it can be verified that the operator exponential $\tau^a = e^{a \partial_x}$ applied to a function g(x) is a translation:

$$e^{a \partial_x} g(x) = g(x) + a g'(x) + \frac{1}{2} a^2 g''(x) + \cdots = g(x + a),$$

which is the Taylor series expansion of g(x+a) around x. Exponentials of operators can be defined similarly in terms of the formal Taylor series $$e^{\mathcal{D}} = \Sigma_{k=0}^{\infty} \mathcal{D}^k / k!$$

or more broadly as the solution to the partial differential equation:

$$\partial_t g(t,x) = (Dg)(t,x), g(0,x) = g(x) \tag{3}$$

at time t=1: $e^{\mathcal{D}} g(x) = g(t=1, x)$.

Following the discussion in the discrete case, translation invariance of $\mathcal{D}_k$ imposes that it is expressed in terms of powers of the generators. Collecting the derivatives into the gradient $\nabla$, the general form of $D_k$ can be written as $$\alpha_k + \beta_k^T \nabla + \frac{1}{2} \nabla^T \sum_k \nabla + \ldots$$

for any constants $\alpha_k$, vectors $\beta_k$, matrices $\Sigma_k$, etc. For simplicity, the series may be truncated at second order to get:

$$D_k = \beta_k^\top \nabla + \frac{1}{2} \nabla^\top \Sigma_k \nabla, \tag{4}$$

where the constants $\alpha_k$ that can be absorbed into the definition of $W_k$ are omitted. For this choice of $\mathcal{D}$, the partial differential in Equation 3 is nothing but the diffusion equation with drift $\beta_k$ and diffusion $\Sigma_k$. When discussing rotational equivariance, below, a more general form of $\mathcal{D}$ is also considered.

The diffusion layer can also be viewed in another way as the infinitesimal generator of an Ito diffusion (a stochastic process). Given an Ito process with constant drift and diffusion $dX_t = \beta dt + \Sigma^{1/2} dB_t$, where $B_t$ is a d dimensional Brownian motion, the time evolution operator can be written via the Feynman-Kac formula as $e^{t\mathcal{D}} f(x) = [f(X_t)]$, where $X_0 = x$. In other words, the operator layer $\mathcal{A} = e^{t\mathcal{D}}$ is the expectation under a parametrized Neural Stochastic Differential equation that is homogeneous and therefore shift invariant. The flow of this stochastic differential equation depends on the drift and diffusion parameters $\beta$ and $\Sigma$.

To recap, a convolution operator may be defined through the general form $\mathcal{A}=\Sigma_k W_k e^{\mathcal{D}k}$, where the weight matrices $W_k \in \mathbb{R}^{c \times c}$ mix only channels and $e^{\mathcal{D}k}$ is the forward evolution by one unit of time of the diffusion equation with drift $\beta_k$ and diffusion $\Sigma_k$ containing learnable parameters $$\{(W_k, \beta_k, \Sigma_k)\}_{k=1}^{K}.$$

The translation equivariance of $\mathcal{A}$ follows directly from the fact that the generators commute $\forall k$, i: $[\mathcal{D}_k, \nabla_i]=0$ and therefore $[\mathcal{A}, \tau_i]=0$ (the bracket [a, b]=ab−ba is the commutator of the two operators).

Application on Radial Basis Function Gaussian Processes

Although the application of the linear operator $\mathcal{A}=\Sigma_k W_k e^{\mathcal{D}k}$ involves the time evolution of a partial differential equation, owing to properties of the radial basis function kernel, the operator may beneficially be applied to an input Gaussian process in closed form. Gaussian processes are closed under linear transformations. For example, given $f \sim GP(\mu_p, k_p)$, the action of $\mathcal{A}$ need only be computed on the mean and covariance: $\mathcal{A}f \sim GP(A\mu_p, Ak_p A')$, where A' is the adjoint with respect to the $L_2(X)$ inner product. The application of time evolution $e^{\mathcal{D}k}$ is a convolution with a Green's function $G_k$, so $\mathcal{A}f=\Sigma_k W_k e^{\mathcal{D}k}f=\Sigma_k W_k G_k * f$. In one aspect, the Green's function for $$\mathcal{D}_k = \beta_k^\top \nabla + (1/2)\nabla^\top \Sigma_k \nabla,$$

is nothing but the multivariate Gaussian density $G_k(x)=N(x;-\beta_k,\Sigma_k)$ according to:

$$\mathcal{A} f=\Sigma_k W_k e^{\mathcal{D}k}f=\Sigma_k W_k G_k * f=\Sigma_k W_k N(-\beta_k,\Sigma_k)*f. \quad (5)$$

In order to apply $e^{t\mathcal{D}}$ to the posterior Gaussian process, the operator need only be applied to the posterior mean and covariance. This posterior mean and covariance in Equation 1 are expressed in terms of $k_{RBF}=\alpha N(x; x', \ell^2 I)$ and the computation boils down to a convolution of two Gaussians:

$$e^{t\mathcal{D}}k_{RBF}(x,x')= N(x;t\beta,t\Sigma)*\alpha N(x;x', \ell^2 I)=\alpha$$
$$N(x;x'-t\beta, \ell^2 I+t\Sigma) \quad (6)$$

$$e^{t\mathcal{D}_1}k_{RBF}(x,x')e^{t\mathcal{D}_2 t}=\alpha N(x;x'-t(\beta_1-\beta_2), \ell^2 I+ t\Sigma_1+t\Sigma_2). \quad (7)$$

The application of the channel mixing matrices $W_k$ and summation is also straightforward through matrix multiplication for the mean and covariance. To summarize, because of the closed form action on the radial basis function kernel, the layer can be implemented efficiently and exactly with no discretization or approximations.

Note with respect to Green's function above that the action of $\mathcal{A}$ encompasses the ordinary convolution operator on the 2d lattice as a special case. For example, given drift $\beta_k \in \{-1, 0, 1\}^{\times 2}$, k=1, . . . , 9 filling out the 9 elements of a 3×3 grid and as the diffusion $\Sigma_k \to 0$, the Green's function is a Dirac delta, so that:

$$\mathcal{A}f(x)=\Sigma_k W_k \delta(x-\beta_k)*f(x)=\Sigma_{i,j=-1,0,1}W_{ij}f(x_1-i,x_2-j)=W *\mathbb{Z}^2 f(x).$$

General Equivariance

The convolutional layers discussed so far are translation equivariant, but it is possible to extend the continuous linear operator layers to more general symmetries, such as rotations. Feature fields in this more general case are described by tensor fields, where the symmetry group acts not only on the input space X but also on the vector space attached to each point $x \in X$. A linear layer $\mathcal{A}$ is equivariant if its action commutes with that of the symmetry. It is possible to derive constraints for general linear operators and symmetries, which generalize those known in the context of steerable convolutional neural networks.

Probabilistic Nonlinearities and Rectified Gaussian Processes

It is possible to derive the mean and variance for a univariate rectified Gaussian distribution for use in a neural network. This can then be generalized to the full covariance function (and higher moments) of a rectified Gaussian process.

For example, for an input GP $\mathcal{A}^{(\ell)} f^{(\ell)}(x) \sim GP(\mu(x), k(x,x'))$, the standard deviation may be denoted $\sigma(x)= \sqrt{k(x,x)}$, the matrix with components $\Sigma_{ij}=k(x_i,x_j)$ for i, j=1, 2, and the mean $\mu=[\mu(x_1), \mu(x_2)]$. The notation $\Phi(z)$ may be used for the univariate standard normal cumulative distribution function (CDF), and $\Phi(z; \Sigma)$ may be used for (two-dimensional) multivariate CDF of $N(0, \Sigma)$ at z. $\Sigma_1$ and $\Sigma_2$ are the column vectors of $\Sigma$. The first and second moments of $h=ReLU[\mathcal{A}f]$ are:

$$\mathbb{E}[h(x)]=\mu(x)\Phi(\mu(x)/\sigma(x))+\sigma(x)\Phi'(\mu(x)/\sigma(x)), \quad (8)$$

$$\mathbb{E}[h(x_1)h(x_2)] = (k(x_1, x_2) + \mu(x_1)\mu(x_2))\Phi(\mu;) + \quad (9)$$
$$\left(\mu(x_1)\sum_2^\top + \mu(x_2)\sum_1^\top\right)\nabla\Phi(\mu;) + \sum_2^\top\nabla\nabla^\top\Phi(\mu;)\sum_2,$$

where $\nabla\nabla^T\Phi$ denotes the Hessian of $\Phi$ with respect to the first argument. The first and higher order derivatives of the Normal CDF are just the probability distribution function (PDF) and products of the PDF with Hermite polynomials. Note that the mean and covariance interact through the nonlinearity.

Channel Mixing and Central Limit Theorem

After the nonlinearity is applied (e.g., probabilistic ReLU), the process is no longer Gaussian. To overcome this issue, a channel mixing matrix $M^{(\ell)} \in \mathbb{R}^{c_{\ell+1} \times c_\ell}$ is introduced, and the feature map is defined in the following layer by $f^{(\ell+1)}= M^{(\ell)} h^{(\ell)}$, where $h^{(\ell)}=ReLU[\mathcal{A}^{(\ell)} f^{(\ell)}]$. So long as the channels of $h^{(\ell)}$ are only weakly dependent, the central limit theorem (CLT) may be applied to each function according to $f_\alpha^{(\ell+1)}=\Sigma_{\beta=1}^{c_\ell} M_{\alpha\beta}^{(\ell)} h_\beta^{(\ell)}$ so that in the limit of large $c_\ell$, the statistics of the $f_\alpha^{(\ell+1)}$'s converge to a Gaussian process with first and second moments given by:

$$\mathbb{E}[f^{(\ell+1)}(x)]=M\mathbb{E}[h^{(\ell)}(x)], \mathbb{E}[f^{(\ell+1)}(x)f^{(\ell+1)}(x')^T]=M\mathbb{E}[h^{(\ell)}(x)h^{(\ell)}(x')^T]M^T \quad (10)$$

The convergence to a Gaussian process here is reminiscent of the well-known infinite width limit of Bayesian neural networks. However the setting here is fundamentally different. Unlike the Bayesian case where the distribution of M is given by a prior or posterior, in the case of a probabilistic numeric convolutional neural network (PNCNN), M is a deterministic quantity and instead the uncertainty is about the input. Thus, a PNCNN is not a Bayesian method in the sense of representing uncertainty about the parameters of the model, but instead it is Bayesian in representing and propagating the uncertainty in the value of the inputs.

Measurement and Projection to RBF Gaussian Process

As a last step, the mean and covariance functions of the approximate GP $f^{(\ell+1)}$ are simplified. While it is possible to compute the values of these functions, unlike in the RBF kernel case, it is not possible to apply the convolution operator $e^{tD}$ in closed form. In order to circumvent this challenge, the (approximately) Gaussian process $f^{(\ell+1)}$ is modeled with an RBF Gaussian process as follows. First, the mean $y_i = \mathbb{E}[f^{(\ell+1)}(x_i)]$ and variance $$\sigma_i^2 = \mathbb{V}ar\left[f^{(\ell+1)}(x_i)\right]$$

of the approximate Gaussian process $f^{(\ell+1)}$ are evaluated at a collection of points $$\{x_i\}_{i=1}^N$$

using Equations 8, 9 and 10. These values $y_i$ are treated as measurements of the underlying signal with a heteroscedastic noise $$\sigma_i^2$$

that varies from point to point. Second, the RBF-based posterior GP of this signal $$\hat{f}^{(\ell+1)} \mid \{(x_i, y_i, \sigma_i)\}_{i=1}^N \sim \mathcal{GP}(\mu_p, k_p)$$

with posterior mean and covariance given by (1) is computed for the heteroscedastic noise model. The uncertainty in the input $f^{(\ell)}$ is propagated through to the RBF posterior $$\hat{f}^{(\ell+1)} \mid \{(x_i, y_i, \sigma_i)\}_{i=1}^N$$

via the measurement noise $\sigma_i$. Notably, this Gaussian process mean and covariance functions are written in terms of the RBF kernel and therefore it is possible to continue applying convolutions in closed form in future layers.

As described further below, the RBF kernel in each layer is trained to maximize the marginal likelihood of the data that it sees, and thereby minimize the discrepancy with the underlying generating distribution $f^{(\ell+1)}$. This measurement/projection approach is effective in many scenarios.

Training Procedure

An example neural network model, such as depicted in FIG. 1, may have two sets of parameters: the channel mixing and diffusion parameters, $$\left\{\left(M^{(\ell),(\ell)}, \beta^{(\ell)}, \sum^{(\ell)}\right)\right\}_{\ell=1}^L,$$

as well as kernel hyperparameters of the Gaussian Processes $$\{(l^{(\ell)}, a^{(\ell)})\}_{\ell=1}^L.$$

In some aspects, all parameters are trained jointly on the loss $L_{task} + \lambda L_{\mathcal{GP}}$, where $L_{task}$ is the cross entropy with log its given by the mean $\mu_p$ of the pooled features $P(f^{(L)}) \sim N(\mu_p, \Sigma_p)$ and $L_{\mathcal{GP}}$ is the marginal log likelihoods of the GP feature maps:

$$L_{\mathcal{GP}}(f) = \tag{11}$$
$$\frac{1}{2}\sum_{\ell=1}^L \sum_{\alpha=1}^{C_\ell} \left[\left(f_\alpha^T [K_{XX} + S_\alpha]^{-1} f_\alpha\right) + \log\det[K_{XX} + S_\alpha] + N\log 2\pi\right]^{(\ell)},$$

where for each layer $\ell$, $f_\alpha = [f_\alpha(x_i), \ldots, f_\alpha(x_N)]\Sigma \mathbb{R}^N$ are the observed values for channel $\alpha$ at locations $X = [x_1, \ldots, x_N]$, $K_{XX}$ is the covariance of the RBF kernel and $$S_\alpha = \text{diag}(\sigma_\alpha^2)$$

the measurement noise for each channel a and spatial location, and log det[•] is a log determinant function. Notably the GP marginal likelihood is independent of the class labels.

Example Probabilistic Numeric Convolutional Neural Network Architecture

FIG. 1 depicts an example 100 of a probabilistic numeric convolutional neural network architecture. In the depicted example, input data is superpixel data, which is an example of sparsely sampled continuous data, though in other aspects, other types of input data, including other types of sparsely (or irregulary) sampled input data may be used. Generally, the mean and elementwise uncertainty of the Gaussian process feature maps are shown as they are transformed through the network by the convolution layers. Observation points shown as dots in $\sigma(x)$.

As depicted, in a first convolution layer 104, a Gaussian process 106 is determined based on the input data x, which includes a determined mean function $\mu_1(x)$ 108 and a determined standard deviation $\sigma_1(x)$ 110. The standard deviation $\sigma_1(x)$ may then be used to determine a covariance. In one aspect, as described above, a covariance kernel k(x, x') can be determined as above in Equation 1.

This Gaussian process 106 in layer 104 is used to interpolate the data input to linear operator $\mathcal{A}^{(1)}$ 112, which in-turn generates pre-activation data, and thus substitutes for a conventional convolution layer. In some aspects, linear operator $\mathcal{A}^{(1)}$ is implemented as a diffusion process, which replaces learnable parameters in the convolutional neural network, as described above.

Then, a pointwise nonlinear operation (probabilistic ReLU in this example) is applied to the pre-activation data to generate activations, and then channel mixing is performed, as described above. Finally, the current Gaussian process is evaluated (measured) at a given set of points and the uncertainty of Gaussian process is treated as a heteroscedastic noise model. This is the output of the layer that can be then passed on to the next layer, which yields a new Gaussian process for the second layer, with transformed mean function $\mu_2(x)$ and standard deviation $\sigma_2(x)$.

This process is repeated through a plurality of layers (four in this example) and ends with an integral pooling operation (as discussed above) at 114. The output 116 of the model and process 100 in this example is a random variable $\mathcal{N}$ with mean $\mu$ and uncertainty $\Sigma$.

As depicted, during training, the cross-entropy loss of the model output is minimized along with the sum of the marginal log likelihoods (MLL) of each layer, for example, according to Equation 11 above. However, in other aspects, the cross-entropy loss is first minimized, followed by the sum of the marginal log likelihoods.

Example Method for Performing Operations with a Probabilistic Numeric Convolutional Neural Network Model FIG. 2 depicts an example method 200 for performing operations with a probabilistic numeric neural network.

Method 200 begins at step 202 with receiving input data (e.g., x). In some aspects, the input data is in the form of a vector-valued function (e.g., $f(x)$).

Method 200 then proceeds to step 204 with calculating a mean of the input data (e.g., $\mu(x)$).

Method 200 then proceeds to step 206 with calculating a covariance of the input data (e.g., $k(x, x')$).

Method 200 then proceeds to step 208 with determining a Gaussian process based on the mean and the covariance of the input data (e.g., GP $(\mu(x), k(x, x'))$), where $k(x, x')=\sigma^2(x)$.

Method 200 then proceeds to step 210 with applying a linear operator ($\mathcal{A}$) to the Gaussian process to generate pre-activation data. In one aspect, this may be performed according to $\mathcal{A}[f]\sim GP(\mathcal{A}\mu(x), \mathcal{A}k(x, x')A^\dagger)$.

Method 200 then proceeds to step 212 with applying a nonlinear operation to the pre-activation data to form activation data (e.g., $\sigma(\mathcal{A}[f])$, where $\sigma$ is a nonlinear operator such as ReLU). In some embodiments, a channel mixing may further be performed to the activation data, such as according to Equation 10 above. In some aspects, step 212 may be performed iteratively across two or more layers of a model.

Method 200 then proceeds to step 214 with applying a pooling operation to the activation data to generate an inference. In some aspects, the pooling operation is an integral pooling operation, such as described above. In some aspects, the inference is in the form of a random variable $\mathcal{N}$ with mean $\mu$ and uncertainty $\Sigma$ (e.g. N($\mu, \Sigma$)), such as 116 in FIG. 1.

During a training phase, method 200 may then optionally proceed to step 216 with calculating a loss based on the inference.

Further during a training phase, method 200 may then optionally proceed to step 218 with training parameters of the linear operator (e.g., $\mathcal{A}$) based on the loss.

In some aspects of method 200, applying a linear operator to the Gaussian process comprises applying a diffusion equation (e.g., $e^{tD}f(x)$).

In some aspects of method 200, the loss comprises a cross-entropy component.

In some aspects of method 200, the loss further comprises a marginal log likelihood component associated with the Gaussian process; and the method further comprises: training parameters of the Gaussian process based on the marginal log likelihood component associated with the Gaussian process.

In some aspects of method 200, training parameters of the linear operator comprises performing gradient descent on the parameters of the linear operator.

In some aspects of method 200, training parameters of the Gaussian process comprises performing gradient descent on the parameters of the Gaussian process.

In some aspects of method 200, the nonlinear operation comprises a probabilistic ReLU operation.

In some aspects of method 200, the input data comprises irregularly sampled data (e.g., $$\{(x_i, f(x_i))\}_{i=1}^N.$$

Example Processing System

Figure 3:
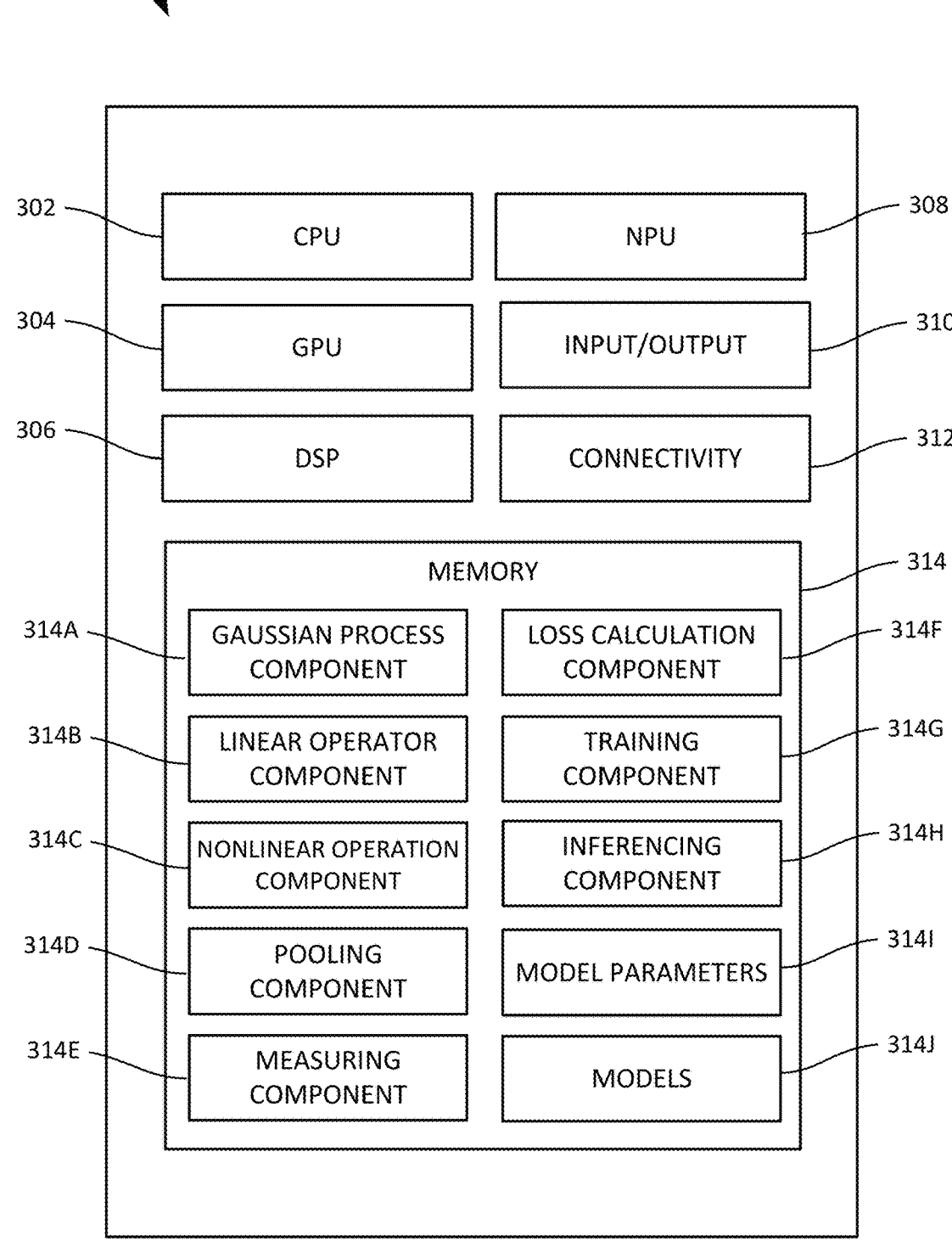
FIG. 3 depicts an example processing system configured to perform the various methods described herein.

FIG. 3 depicts an example processing system 300 configured to perform the various methods described herein, including, for example, with respect to FIGS. 1 and 2.

Processing system 300 includes a central processing unit (CPU) 302, which in some examples may be a multi-core CPU. Instructions executed at the CPU 302 may be loaded, for example, from a program memory associated with the CPU 302 or may be loaded from memory 314.

Processing system 300 also includes additional processing components tailored to specific functions, such as a graphics processing unit (GPU) 304, a digital signal processor (DSP) 306, and a neural processing unit (NPU) 308.

An NPU, such as 308, is generally a specialized circuit configured for implementing all the necessary control and arithmetic logic for executing machine learning algorithms, such as algorithms for processing artificial neural networks (ANNs), deep neural networks (DNNs), random forests (RFs), probabilistic numeric convolutional neural networks (PNCNNs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as 308, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 308 is a part of one or more of CPU 302, GPU 304, and/or DSP 306.

In some examples, connectivity component 312 may include various subcomponents, for example, for wide area network (WAN), local area network (LAN), Wi-Fi connectivity, Bluetooth connectivity, and other data transmission standards.

Processing system 300 may also include one or more input and/or output devices 310, such as screens, touch-sensitive surfaces (including touch-sensitive displays), physical buttons, speakers, microphones, and the like.

In some examples, one or more of the processors of processing system 300 may be based on an ARM or RISC-V instruction set.

Processing system 300 also includes memory 314, which is representative of one or more static and/or dynamic memories, such as a dynamic random access memory, a flash-based static memory, and the like. In this example, memory 314 includes computer-executable components, which may be executed by one or more of the aforementioned processors of processing system 300.

In this example, memory 314 includes Gaussian process component 314A, linear operator component 314B, nonlinear operation component 314C, pooling component 314D, measuring component 314E, loss calculation component 314F, training component 314G, inferencing component 314H, model parameters 3141, and models 314J. The depicted components, and others not depicted, may be configured to perform various aspects of the methods described herein.

Generally, processing system 300 and/or components thereof may be configured to perform the methods described herein, including methods described with respect to FIGS. 1 and 2.

Notably, in other aspects, processing system 300 may include additional, alternative, or fewer elements. Further, various aspects of methods described above may be performed on one or more processing systems.

EXAMPLE CLAUSES

Implementation examples are described in the following numbered clauses:

Clause 1: A method of performing operations with a probabilistic numeric neural network, comprising: defining a Gaussian Process based on a mean and a covariance of input data; applying a linear operator to the Gaussian Process to generate pre-activation data; applying a nonlinear operation to the pre-activation data to form activation data; and applying a pooling operation to the activation data to generate an inference.

Clause 2: The method of Clause 1, wherein the inference comprises a random variable.

Clause 3: The method of any one of Clauses 1-2, wherein applying a linear operator to the Gaussian process comprises applying a diffusion equation to the Gaussian process.

Clause 4: The method of any one of Clauses 1-3, further comprising: calculating a loss based on the inference; and training parameters of the linear operator based on the loss.

Clause 5: The method of Clause 4, wherein: the loss further comprises a cross entropy component.

Clause 6: The method of Clause 5, wherein: the loss further comprises a marginal log likelihood component associated with the Gaussian process, and the method further comprises: training parameters of the Gaussian process based on the marginal log likelihood component associated with the Gaussian process.

Clause 7: The method of Clause 5, wherein training parameters of the linear operator comprises performing gradient descent on the training parameters of the linear operator.

Clause 8: The method of any one of Clauses 6-7, wherein training parameters of the Gaussian process comprises performing gradient descent on the training parameters of the Gaussian process.

Clause 9: The method of any one of Clauses 1-8, wherein the nonlinear operation comprises a probabilistic ReLU operation.

Clause 10: The method of any one of Clauses 1-9, wherein the input data comprises irregularly sampled data.

Clause 11: The method of any one of claims 1-10 wherein the linear operator comprises $\mathcal{A} = \Sigma_k W_k e^{\mathcal{D}k}$ and applying the linear operator to pre-activation data is performed according to Equation 5.

Clause 12: A processing system, comprising: a memory comprising computer-executable instructions; and one or more processors configured to execute the computer-executable instructions and cause the processing system to perform a method in accordance with any one of Clauses 1-11.

Clause 13: A processing system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or compo-
nents as appropriate. For instance, the methods described
may be performed in an order different from that described,
and various steps may be added, omitted, or combined. Also,
features described with respect to some examples may be
combined in some other examples. For example, an appa-
ratus may be implemented or a method may be practiced
using any number of the aspects set forth herein. In addition,
the scope of the disclosure is intended to cover such an
apparatus or method that is practiced using other structure,
functionality, or structure and functionality in addition to, or
other than, the various aspects of the disclosure set forth
herein. It should be understood that any aspect of the
disclosure disclosed herein may be embodied by one or
more elements of a claim.

As used herein, the word "exemplary" means "serving as
an example, instance, or illustration." Any aspect described
herein as "exemplary" is not necessarily to be construed as
preferred or advantageous over other aspects.

As used herein, a phrase referring to "at least one of" a list
of items refers to any combination of those items, including
single members. As an example, "at least one of: a, b, or c"
is intended to cover a, b, c, a-b, a-c, b-c, and a-b-c, as well
as any combination with multiples of the same element (e.g.,
a-a, a-a-a, a-a-b, a-a-c, a-b-b, a-c-c, b-b, b-b-b, b-b-c, c-c,
and c-c-c or any other ordering of a, b, and c).

As used herein, the term "determining" encompasses a
wide variety of actions. For example, "determining" may
include calculating, computing, processing, deriving, inves-
tigating, looking up (e.g., looking up in a table, a database
or another data structure), ascertaining and the like. Also,
"determining" may include receiving (e.g., receiving infor-
mation), accessing (e.g., accessing data in a memory) and
the like. Also, "determining" may include resolving, select-
ing, choosing, establishing and the like.

The methods disclosed herein comprise one or more steps
or actions for achieving the methods. The method steps
and/or actions may be interchanged with one another with-
out departing from the scope of the claims. In other words,
unless a specific order of steps or actions is specified, the
order and/or use of specific steps and/or actions may be
modified without departing from the scope of the claims.
Further, the various operations of methods described above
may be performed by any suitable means capable of per-
forming the corresponding functions. The means may
include various hardware and/or software component(s)
and/or module(s), including, but not limited to a circuit, an
application specific integrated circuit (ASIC), or processor.
Generally, where there are operations illustrated in figures,
those operations may have corresponding counterpart
means-plus-function components with similar numbering.

The following claims are not intended to be limited to the
embodiments shown herein, but are to be accorded the full
scope consistent with the language of the claims. Within a
claim, reference to an element in the singular is not intended
to mean "one and only one" unless specifically so stated, but
rather "one or more." Unless specifically stated otherwise,
the term "some" refers to one or more. No claim element is
to be construed under the provisions of 35 U.S.C. § 112(f)
unless the element is expressly recited using the phrase
"means for" or, in the case of a method claim, the element
is recited using the phrase "step for." All structural and
functional equivalents to the elements of the various aspects
described throughout this disclosure that are known or later
come to be known to those of ordinary skill in the art are
expressly incorporated herein by reference and are intended
to be encompassed by the claims. Moreover, nothing disclosed herein is intended to be dedicated to the public
regardless of whether such disclosure is explicitly recited in
the claims.

What is claimed is:
1. A method of performing operations with a probabilistic
numeric convolutional neural network, comprising:
   receiving, by the probabilistic numeric convolutional neu-
      ral network, continuous input sensor data comprising
      irregularly sampled data provided by one or more
      sensors onboard a device;
   defining, by a convolution layer of the probabilistic
      numeric convolutional neural network, a Gaussian Pro-
      cess based on a mean and a covariance of the continu-
      ous input sensor data;
   applying, by the convolution layer of the probabilistic
      numeric convolutional neural network, a linear opera-
      tor that involves a time evolution of a partial differential
      equation to the Gaussian Process to generate pre-
      activation data;
   forming, by the convolution layer of the probabilistic
      numeric convolutional neural network, activation data
      by applying a nonlinear operation to the pre-activation
      data and applying one or more channel mixing matrices
      to converge to a corresponding Gaussian process;
   generating, by the probabilistic numeric convolutional
      neural network, an inference based on applying, by a
      global average pooling layer of the probabilistic
      numeric convolutional neural network, a pooling
      operation to the activation data;
   outputting, by the probabilistic numeric convolutional
      neural network, the inference in response to the con-
      tinuous input sensor data; and
   automatically detecting a feature in the continuous input
      sensor data based on the inference.
2. The method of claim 1, wherein the inference com-
prises a random variable.
3. The method of claim 1, wherein applying a linear
operator to the Gaussian process comprises applying a
diffusion equation to the Gaussian process.
4. The method of claim 1, further comprising:
   calculating a loss based on the outputting of the inference;
      and
   training parameters of the linear operator based on the
      loss to produce a trained probabilistic numeric convo-
      lutional neural network.
5. The method of claim 4, wherein the loss comprises a
cross entropy component.
6. The method of claim 5, wherein:
   the loss further comprises a marginal log likelihood
      component associated with the Gaussian process, and
   the method further comprises training parameters of the
      Gaussian process based on the marginal log likelihood
      component associated with the Gaussian process to
      produce the trained probabilistic numeric convolutional
      neural network.
7. The method of claim 6, wherein training parameters of
the linear operator comprises performing gradient descent
on the parameters of the linear operator.
8. The method of claim 7, wherein training parameters of
the Gaussian process comprises performing gradient descent
on the parameters of the Gaussian process.
9. The method of claim 1, wherein the nonlinear operation
comprises a probabilistic ReLU operation.
10. A processing system, comprising:
   a memory comprising computer-executable instructions;
      and one or more processors configured to execute the computer-executable instructions and cause the processing system to:

receive, by the probabilistic numeric convolutional neural network, continuous input sensor data comprising irregularly sampled data provided by one or more sensors onboard a device;

define, by a convolution layer of the probabilistic numeric convolutional neural network, a Gaussian Process based on a mean and a covariance of the continuous input sensor data;

apply, by the convolution layer of the probabilistic numeric convolutional neural network, a linear operator that involves a time evolution of a partial differential equation to the Gaussian Process to generate pre-activation data;

form, by the convolution layer of the probabilistic numeric convolutional neural network, activation data by applying a nonlinear operation to the pre-activation data and applying one or more channel mixing matrices to converge to a corresponding Gaussian process;

generate, by the probabilistic numeric convolutional neural network, an inference based on applying, by a global average pooling layer of the probabilistic numeric convolutional neural network, a pooling operation to the activation data;

output, by the probabilistic numeric convolutional neural network, the inference in response to the continuous input data; and automatically detecting a feature in the continuous input sensor data based on the inference.

11. The processing system of claim 10, wherein the inference comprises a random variable.

12. The processing system of claim 10, wherein in order to apply a linear operator to the Gaussian process, the one or more processors are further configured to cause the processing system to apply a diffusion equation to the Gaussian process.

13. The processing system of claim 10, wherein the one or more processors are further configured to cause the processing system to:

calculate a loss based on the outputting of the inference; and train parameters of the linear operator based on the loss to produce a trained probabilistic numeric convolutional neural network.

14. The processing system of claim 13, wherein the loss comprises a cross entropy component.

15. The processing system of claim 14, wherein:

the loss further comprises a marginal log likelihood component associated with the Gaussian process, and the one or more processors are further configured to cause the processing system to train parameters of the Gaussian process based on the marginal log likelihood component associated with the Gaussian process to produce the trained probabilistic numeric convolutional neural network.

16. The processing system of claim 15, wherein in order to training parameters of the linear operator, the one or more processors are further configured to cause the processing system to perform gradient descent on the parameters of the linear operator.

17. The processing system of claim 16, wherein in order to train parameters of the Gaussian process, the one or more processors are further configured to cause the processing system to perform gradient descent on the parameters of the Gaussian process.

18. The processing system of claim 10, wherein the nonlinear operation comprises a probabilistic ReLU operation.

19. A non-transitory computer-readable medium comprising computer-executable instructions that, when executed by a processor of a processing system, cause the processing system to perform a method of training a probabilistic numeric neural network, the method comprising:

receiving, by the probabilistic numeric convolutional neural network, continuous input sensor data comprising irregularly sampled data provided by one or more sensors onboard a device;

defining, by a convolution layer of the probabilistic numeric convolutional neural network, a Gaussian Process based on a mean and a covariance of the continuous input sensor data;

applying, by the convolution layer of the probabilistic numeric convolutional neural network, a linear operator that involves a time evolution of a partial differential equation to the Gaussian Process to generate pre-activation data;

forming, by the convolution layer of the probabilistic numeric convolutional neural network, activation data by applying a nonlinear operation to the pre-activation data and applying one or more channel mixing matrices to converge to a corresponding Gaussian process;

generating, by the probabilistic numeric convolutional neural network, an inference based on applying, by a global average pooling layer of the probabilistic numeric convolutional neural network, a pooling operation to the activation data;

outputting, by the probabilistic numeric convolutional neural network, the inference in response to the continuous input data; and automatically detecting a feature in the continuous input sensor data based on the inference.

20. The non-transitory computer-readable medium of claim 19, wherein the inference comprises a random variable.

21. The non-transitory computer-readable medium of claim 19, wherein applying a linear operator to the Gaussian process comprises applying a diffusion equation to the Gaussian process.

22. The non-transitory computer-readable medium of claim 19, wherein the method further comprises:

calculating a loss based on the outputting of the inference; and training parameters of the linear operator based on the loss to produce a trained probabilistic numeric convolutional neural network.

23. The non-transitory computer-readable medium of claim 22, wherein the loss comprises a cross entropy component.

24. The non-transitory computer-readable medium of claim 23, wherein:

the loss further comprises a marginal log likelihood component associated with the Gaussian process, and the method further comprises training parameters of the Gaussian process based on the marginal log likelihood component associated with the Gaussian process to produce the trained probabilistic numeric convolutional neural network.

25. The non-transitory computer-readable medium of claim 24, wherein:

training parameters of the linear operator comprises performing gradient descent on the parameters of the linear operator, and training parameters of the Gaussian process comprises performing gradient descent on the parameters of the Gaussian process.

\* \* \* \* \*